United States Patent Office 3,473,951
Patented Oct. 21, 1969

3,473,951
CURABLE COATING COMPOSITION AND SELF-SKINNED POLYURETHANE FOAM ARTICLE COATED WITH SAME
Frank De Rossi, Zion, and Carl A. Osterberg, Waukegan, Ill., assignors to The Dexter Corporation, Windsor Locks, Conn., a corporation of Connecticut
No Drawing. Filed Jan. 2, 1968, Ser. No. 694,843
Int. Cl. B44d 1/12, 1/22
U.S. Cl. 117—72                          30 Claims

ABSTRACT OF THE DISCLOSURE

A curable coating composition and self-skinned polyurethane foam articles coated with such composition, wherein the composition includes a hard polyester having a molecular weight between about 800 and 3000 and a hydroxyfunctionality higher than about 2.8; a flexible polyester having a molecular weight between about 1500 and 4000 and a hydroxyfunctionality of about 2.0; and an aliphatic polyisocyanate.

---

This invention relates to a new and useful coating system which is particularly useful in coating foamed polyurethane articles. More particularly, this invention relates to a coating system based on the reaction product of an aliphatic diisocyanate with a specific mixture of hydroxy functional polyesters. The coating systems of this invention show surprising resistance to yellowing, loss of gloss, peeling, chipping, wearing and the like, particularly when used to coat foamed polyurethane substrates.

During the last several years, the use of foam in many applications, especially in the automobile industry, has grown enormously, and the technology involved therewith has likewise been expanded. In particular, polyurethane foam systems have been developed in a sufficient variety of properties that foams of appropriate flex, density and the like can be produced in appropriate shapes. Particularly in the automotive industry, where the emphasis of recent years has been on safety, the use of foam as padding for various automotive parts has expanded greatly. However, in order to meet the durability and aesthetic requirements set up by the automotive manufacturers, the foam must have a surface that is not only aesthetically pleasing in color, texture and the like, but which is also weather resistant, abrasion resistant, scuff resistant and sufficiently durable to last the life of the car.

During the past few years, the automobile manufacturers, in cooperation with the suppliers of foam chemicals, have been attempting to develop a flexible urethane foam substrate with a tough, flexible, durable, tightly bound skin. This objective has been partially accomplished in the material known as the "self-skinned" urethane foam which is presently under development. The major advantage of such an integral foam substrate is that the manufacturing is simple and the cost is low.

The self-skinned polyurethane foam substrates are generally produced from two package systems using a diisocyanate in one package and a polyol in the other. As a rule, the diisocyanate compound which yields the best combination of performance and cost is toluene diisocyanate, and therefore that is the most popular compound. However, other aromatic diisocyanates are on the market, and have been found to give useful results. The second reactive component usually comprises mixtures of hydroxy function aryl and/or alkyl hydrocarbon derivatives typically containing either ester or ether linkages, water, proprietary silicones, foaming agents, and other additives which are used to impart the desired properties. Prior to mixing, the reactive components are held in separate containers, each under pressure and blanketed with an inert gas such as nitrogen. The two reactive components are mixed just prior to injection into the mold. Accurate metering devices permit precise programming and automatic measuring of the two reactive components.

Both components are combined and injected into the mold. Within 15 to 30 seconds, an exothermic reaction occurs between the diisocyanate and the hydroxy function of the polyol to form a flexible micro-cellular structure with a topography corresponding to the inside mold surface. The by-products of this reaction also include carbon dioxide which either alone or with other gases such as water, methylene chloride and freons are used to create the micro-cellular structure, which is necessary to develop the proper degree of compression and flexibility. The reaction therefore between the disocyanates and the polyols and water or other foam agents results in the formation of a micro-cellular high molecular weight polyurethane.

It has been discovered that a tough, flexible integral skin can be formed in the mold "in situ" during the forming of such polyurethanes. The type and density of the skin is maintained by controlling the temperature of the mold surfaces. Temperatures below 160° Fahrenheit favor the formation of thick, dense skins. Temperature in excess of 190° F. results in little or no skin formation. Adequate separation of the in situ skinned urethane foam from the mold can be usually assured by spraying the inside of the mold with a release agent. Various commercial release agents are available for use in such applications.

It is quite evident that the skin for the urethane foam substrate parts, such as those to be used in automobiles, must meet a variety of rigorous physical performance specifications including tear, scuff, flexibility, elongation, abrasion resistance, and deformation. A less obvious, but nevertheless critical property, is color appearance, and control thereof. It is evident, for example, that the acceptability of a part for the interior of an automobile would be predicated upon its color appeal.

Initial attempts to produce a colored self-skinned foam were made by incorporating pigment into the foam substrate. It was quickly discovered that this technique was not practical because a uniformly reproducible color could not be obtained within a single formed part; or between parts; or between different batches of parts. It was quite evident therefore that color and control thereof must be accomplished by an alternate procedure such as the application of organic coatings. Although the polyurethane coatings did give the greatest combination of properties compared to other vehicle types, they did have limitations with regard to the color stability, non-yellowing, and particularly the cold temperature flex property. In fact, because of these limitations the use of polyurethanes in a self-skinning technique has not become feasible.

While all of the advantages of forming a skin in situ are known, the art has not been able to develop a successful skin because of the inability to control color. Because of this inability to form a successful skin, the art has gone to the technique of vacuum forming a sheet of vinyl-ABS material over the foamed material. This, however, requires the use of expensive vinyl-ABS sheet as well as additional labor involved in cutting and lining the molds with the vinyl-ABS plastic sheet.

Thus it can be seen that the self-skinned urethane foam is highly advantageous. It is thus evident that the integral foam concept offers unique processing and cost advantages and at the present is the focal point of several ambitious commercialization programs. The commercial activity is particularly aggressive in the automotive market place where conformity to recent government regulations require a substantial increase in foam for padding the interiors of cars. Because of the higher costs and/or the processing limitations of conventional materials, the integral skinned concept is the only present feasible approach.

Based upon the foregoing, the specifications required for a covering or coating for polyurethane foam parts were fairly well defined. It has been determined that a successful coating must have the following combination of properties:

(1) Good adhesion at various temperature and humidity ranges;
(2) Color stability along with non-yellowing;
(3) Wear i.e. abrasion, scuff and mar resistance;
(4) Crack resistance, particularly resistance to cold cracking;
(5) Age stability;
(6) Resistance to stains and chemicals;
(7) Washability;
(8) Fade and weather resistance; and
(9) Solvent resistance.

It has now been discovered that through the use of the coatings of this invention it is possible to produce a coating which when applied to self-skinned urethane foam, fulfills all the above described requirements and the resulting product is suitable for use in connection with padding in the automotive industry. The most outstanding properties of the coating system of the present invention are: (1) good, highly stable adhesion, which remains stable over a wide variety of humidity and temperature conditions; (2) excellent temperature flexibility over temperature ranges, particularly in the range of below 40 degrees; and (3) unusual resistance to yellowing or discoloration when exposed to strong and prolonged dosages of either ultraviolet light or heat energy. While the coatings of this invention are suitable for use on rigid or flexible foams which require coatings having excellent flex.

It has been determined that a suitable coating can be made by using a polyurethane polymer which can be generally made by reacting an aliphatic diisocyanate and a specific combination of two hydroxy functional polyesters. More desirably, the aliphatic diisocyanate contains at least one ester group in addition to two isocyanate groups. It is essential that one of the hydroxy functional polyesters (hereinafter referred to as the flexible polyester) be limited to about two functional groups per molecule. Preferably the flexible polyester has at least some intermediate ether linkages. The other essential polyester (hereinafter referred to as the hard polyester) should have a hydroxy functionality of more than about 2.8 and preferably about 3.5 and be substantially devoid of ether linkages.

This invention broadly contemplates the use of diisocyanates wherein an aliphatic moiety separates the two isocyanate groups. Although it may be possible to use diisocyanates having aromatic groups, these aromatic groups must not occur between the isocyanate groups, since this tends to cause steric hindrance and the resulting yellowing. More specifically, this invention contemplates aliphatic diisocyanates of the following structure:

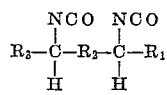

wherein $R_2$ may be lower alkylene or lower alkylidene radical including the cyclic derivatives thereof. $R_3$ may be the same or different from $R_1$, and may be either hydrogen or a radical of the formula:

Wherein $R_4$ can be alkyl, alkoxy alkyl, aryl, alkaryl aralkyl, either substituted or unsubstituted with halogen radicals. For example, cyclic aliphatic diisocyanates may be used such as 4,4'-methylene-bis (cyclo hexyl isocyanate), or acyclic aliphatic such as bis (2-isocyanatoethyl) fumarate may be used.

The best coating systems contemplated by this invention use diisocyanates produced by phosgenating aliphatic monocarboxylic acid esters to form the diisocyanates. It has been found that in forming coatings which are to be pigmented, it is critical that the ester form of the diisocyanate be used. The aliphatic diisocyanate esters contemplated by this invention have the following structure:

The methyl, ethyl, propyl, butyl, hexyl, octyl, dodecyl, stearyl, methoxymethyl, ethoxymethyl, β-methoxyethyl, β-ethoxyethyl, γ-ethoxypropyl, phenyl, benzyl, O-tolyl, O-(2-chlorotoyl), 2-bromethyl, 2-chloropropyl, 1,2-dichloropropyl, 2,3-dichloropropyl, and isopropyl esters of 2,6-diisocyanato caproic acid (lysine diisocyanate), and 2,5-diisocyanato valeric acid (orinithine diisocyanate); the diesters of 2,4- diisocyanato glutaric acid, 2,5-diisocyanato adipic acid, 2,6- diisocyanato pimelic acid, 2,7-diisocyanate suberic acid, 2,9-diisocyanato sebacic acid such as the dimethyl, diethyl, dipropyl, dibutyl, dioctyl, distearyl, diphenyl, dibenzyl, di(O-tolyl), di(O-(2-chlorotolyl)), di(2-chloropropyl), di(2,3-dichloropropyl), and diisopropyl diesters and mixed diesters such as methylpropyl diesters, phenyl-octyl diesters and benzyl-stearyl diesters. The diisocyanates may be either the levo rotatory forms or the dextro rotary forms, racemates or mixtures thereof. The disocyanates preferred for use are the alkyl esters of 2,6-diisocyanato caproic acid, and most preferably the methyl and octyl esters. These diisocyanate esters, as well as other suitable diisocyanate esters, are described in U.S. Patent 3,281,378.

It is essential to the successful practice of this invention that the aforedescribed isocyanates be reacted with a combination of hydroxy functional polyesters.

The hard polyester which is used in this invention must have a functionality higher than 2 and preferably has a functionality from between about 3 to about 5. It is essential that the hard polyester be substantially free from ether linkages. While this hard polyester may be made from a mixture of dicarboxylic acids containing some aromatic dicarboxylic acids, it is preferred that the aromatic content of the acids not exceed about 40 mole percent. Generally speaking, this polyester should be aliphatic in nature, except for the aforesaid aromatic groups. Generally, the molecular weight of the hard polyester should fall between about 800 and about 3000 and the equivalent weight should be between about 300 and about 500.

Polyesters of the hard type may be made by reacting aliphatic dicarboxylic acids such as adipic acid with a polyol mixture containing at least some diols and at least some triols, such as beta-butylene glycol mixed with 30 mole percent of glycerine. Some aromatic group can be incorporated into the polyester by substituting an aromatic dicarboxylic acid, such as phthalic acid anhydride, for the aliphatic dicarboxylic acid.

In the preparation of the foregoing polyesters, the following aliphatic dicarboxylic acids may be used: adipic acid, pimelic acid, maleic acid, succinic acid, glutaric acid and similar acids or mixtures thereof. Up to about 10 mole percent of an aromatic dibasic acid has been used with good results.

The foregoing acids, separately or as a mixture thereof, are reacted with a slight excess of a polyol mixture. The major portion of the polyols comprise a diol, such as ethylene glycol, 1,2-propylene glycol; 1,3-butylene glycol; and higher molecular weight aliphatic glycols. A remaining portion of the polyol mixture is made up of a triol or polyol having a functionality higher than three such as glycerin, pentaerythrithol, trimethylolethane, trimethylol propane, mannitol or the like. It is important that the ratio of the diol to the triol (or higher functionality) be adjusted to give the polyester a hydroxy-functionality of more than about 2.8 and as high as about 5, but not substantially higher. This will be affected by the molecular weight of the polyester.

The flexible polyester which must be used in connection with this invention is essentially difunctional, and preferably contains at least one ether linkage.

The polyesters of the flexible type can be conveniently made by reacting an aliphatic dicarboxylic acid, for example, adipic acid with a slight molecular excess of an aliphatic glycol or aliphatic glycol-ether such as propylene glycol or diethylene glycol in order to produce a hydroxy functional polyether polyester. Generally speaking, it is desired that the molecular weight of this flexible polyester be between 1500 and 4000, and the equivalent weight should fall between about 750 and 2000.

The flexible polyesters may be formed from ether containing glycols of various types such as polypropylene glycol, diethylene glycol, polybutylene glycol or other similar diol ethers or from non-ether glycols such as ethylene glycol, propylene glycol, butylene glycol and the like or from mixtures of glycols with ether glycols. The polyesters are formed by reacting such diols with difunctional aliphatic acids such as adipic acid, oxalic acid, malonic acid, succinic acid, or the like with a slight molar exces of the diol, in order to result in a hydroxy functional product. Aromatic dicarboxylic acids are generally not desired, but small amounts can be tolerated.

In carrying out the present invention, it is important that the correct ratio of polyesters be used. While it is most desirable to use more of the flexible polyester than the hard polyester, it is possible to use them in equal weight ratios. Generally speaking, the flexible polyester may predominate by as much as a 4 to 1 weight ratio and as low as a 1 to 1 weight ratio with respect to the hard polyester.

Particularly in those applications in which high flexibility at extremely low temperatures is required, such as a coating for a resilient polyurethane foam part, the weight ratio between the flexible polyester to the hard polyester should be higher than about 2 to 1, and preferably should be about 3 to 1.

When the hydroxy containing component is mixed with the isocyanate containing component it is important that a slight stoichiometric excess of isocyanate be present. The equivalents ratio of NCO—OH may be run between about 1:1 up to as high as about 2:1.

Generally, the same solvents which are used to mix each of the components initially, may be used in preparing the coating for application. Any of those solvents normally and typically used in the preparation and/or use of polyurethane coating may be used in general. For example, for the lower alkyl esters of the diisocyanates used in preparing the compositions of this invention, may be dissolved in solvents such as nonhydroxy containing esters, ethers, and aromatic hydrocarbons typified by amyl acetate, butyl acetate, ethyl acetate, Cellosolve acetate, xylene, toluene, benzene, carbon tetrachloride, and the like. Likewise some of the aliphatics such as alkanes or cycloalkanes and kerosene type solvents may be used.

The coating compositions of this invention have a pot life of in excess of eight hours. In particular those materials described in Examples 1 through 4, below, have a pot life in excess of the normal eight hours work shift. Although during this time, a slight increase in viscosity may be experienced, dilution with a proper blend of solvents will restore the fluidity that would be necessary for spray application.

The curing speed of these coating systems can be increased by using certain catalysts such as dimethylethanolamine, dibutyl tin dilaurate, or lead naphthanate. By using such catalysts, a satisfactory hardness can be achieved using temperatures as low as 200° F. for 10 minutes. Generally from about 0.1 to about 1% by weight (based on the weight of the reactants) of catalyst is sufficient to achieve these cures. The curing temperature will in general be dependent upon the nature of the starting materials used and is not in of itself critical with respect to this invention. However, certain combinations of temperature and reaction time may result in products not wholly suitable, and such conditions should be avoided. The reaction generally is exothermic, and once initiated, proceeds well with or without catalysts when reaction temperatures are in a range of from about 20° C. to about 100° C. The most preferred temperature range, however, is in the range of between about 60° C. to 80° C. and without catalysts being present, reaction is complete in about four hours.

The compositions of this invention may be used by combining the required polyesters with an appropriate diisocyanate in predetermined proportions, preferably, though not necessarily, in a solvent solution and permitting them to react, preferably for a sufficient length of time to allow the essentially complete reaction between the isocyanate groups and the hydroxy groups. It is also preferable that the isocyanate groups of the coating be allowed to react with the available hydroxy functions on the substrate. It is preferred to have the pigments, reagents and solvents in anhydrous form in order to prevent premature and undesirable reaction between the isocyanate groups and water. It will be appreciated by those skilled in the art that some of the properties of the coatings and the final molecular weight of the resins therein may be varied within the limitations according to the ultimate use to which the composition is being put. As mentioned above, these properties may be regulated in part by regulating the chain length and functionality of the polyol components and the equivalents ratio of the NCO–OH groups.

The following examples will serve to illustrate the preparation of several coating systems of this invention, but it is understood that these examples are set forth merely for illustrative purposes and many other coating systems within the scope of this invention are contemplated. In all of the examples below, the solvents used were essentially free of water and of the grade generally commercially available as "polyurethane grade" solvents.

Example I

A hard polyester used in Examples 1 through 4 was made in a 100 gallon kettle equipped with a packed distillation column which permitted the distillation of water and the retention of glycol. The polyester was formed by charging in the kettle the following materials:

| | Lbs. |
|---|---|
| 1,3-butanediol | 200 |
| Adipic acid | 312 |

These materials were blanketed with inert gas, heated to 400° Fahrenheit, at which temperature they were held for one hour. The kettle was then cooled to 375° Fahrenheit and the following materials were added:

| | Lbs. |
|---|---|
| Glycerine | 67 |
| Phthalic anhydride | 30 |

The kettle was then heated to 425° Fahrenheit and held at that temperature until the acid number was less than 4. The resulting hard polyester was cooled and packaged in 55 gallon drums. The resulting hard polyester had an average functionality 3.5, with a molecular weight of approximately 1200. The hydroxy number was 165 plus or minus 10 and the acid number was a maximum of 4. The viscosity of the polyester was between Z4 and Z6 and the density was about 9.6 pounds per gallon (specific gravity of 1.15).

The flexible polyester used in Examples 1 through 4 was prepared, in same kettle, described above, by mixing the following materials:

| | Lbs. |
|---|---|
| Diethylene glycol | 296 |
| Adipic acid | 337 |

These materials were heated to a temperature of 460° Fahrenheit and held until the acid number was less than 3, at which time the water of condensation had been volatilized. The resulting polyester was then cooled and packaged in 55 gallon drums.

It was determined that this flexible polyester had a molecular weight of approximately 2600 and a functionality of 2. The hydroxy number was about 43 and the maximum acid number was 3. The viscosity ranged between Z4 and Z6 and the density was about 9.8 pounds per gallon (specific gravity of 1.174).

Component A of a two package coating system was made up as follows:

A mixture was made of:

| | Lbs. |
|---|---|
| Titanium dioxide | 400 |
| Hard Polyester | 225 |
| Flexible polyester | 80 |
| N-butyl acetate | 178 |
| Total | 883 |

This mixture was ground in a pebble mill for 48 hours at ambient temperature whereupon a Hegman fineness of 6.5 was achieved. To the thus ground material was added:

| | Lbs. |
|---|---|
| Flexible polyester | 145 |
| Cellulose acetate butyrate | 14 |
| N-butyl acetate | 100 |
| Ethyl acetate | 140 |
| Toluene | 200 |
| Ethylene glycol monoethyl ether acetate | 40 |
| Total | 1,522 |

This gave a weight ratio of the flexible polyester to the hard polyester of 1 to 1 and a mole ratio of about 1 to 2.15 for component A.

Component B of the system was made up by mixing the following materials:

| | Lbs. |
|---|---|
| Lysine diisocyanate adduct (3 moles of methyl ester of lysine diisocyanate adducted with 1 mole of trimethylol propane—80% solids) | 56 |
| Ethyl acetate | 36 |
| Ethylene glycol monoethyl ether acetate | 8 |
| Total | 100 |

This material was blended using two parts by volume of Component A and one part by volume of Component B. This combination yields a ratio of NCO—OH equivalents of 1.35 to 1.0.

The resulting coating system was sprayed over a polyurethane foam to give a film thickness in the range between 0.75 and 1 mil. The film was highly flexible, showed good cold flex, and high abrasion resistance. Room temperature (77°) flexibility was checked by bending the coated foam over a mandrel having a diameter of ⅛ inch and observing the stretched portion of the film with a 10 power magnifying glass. The film showed no cracks, breaks or failures of any kind. The low temperature flexibility was checked by repeating the test described above, but conducting the test on coated foam which was cooled to 40° F. Again the film showed no cracks, breaks or other failures. The abrasion resistance factor was determined using the Tabor Abrasor method on film applied over ABS plastic sheet. Such test showed an average weight loss of 30–40 milligrams per 1000 cycles using a CS 10 wheel with 500 gms. load.

It was determined that the sheen could be adjusted by the addition of flatting agents such as magnesium silicate, diatomaceous silica, and synthetic silicas. The abrasion and scuff resistance could be improved by the addition of polyethylene or polymethylene dispersed by ball milling in solvent such as xylene for 24 hours. Internal lubricants such as petrolatum also may be used.

Example 2

An orange, two package coating system was made and tested. Component A was prepared by mixing the following ingredients:

| | Lbs. |
|---|---|
| Chalk resistant titanium dioxide | 258 |
| Red Iron oxide | 12 |
| Lead chromate yellow | 52 |
| Hard polyester of Example 1 | 103 |
| Flexible polyester of Example 1 | 103 |
| n-Butyl acetate | 40 |
| Xylene | 40 |

This was ground in sand mill until a 6.5 Hegman fineness was obtained and the following materials were added:

| | Lbs. |
|---|---|
| Flexible polyester of Example 1 | 70 |
| Cellulose acetate butyrate | 14 |
| n-Butyl acetate | 120 |
| Ethyl acetate | 42 |
| Toluene | 44 |
| Cellosolve acetate | 52 |
| Xylene | 50 |
| Total | 1,000 |

The resulting component A had a weight ratio of flexible polyester to hard polyester of 1.68 to 1 and a molar ratio of 1.0 to 1.3. This component A was blended with the component B shown in Example 1, at 2 parts by volume of component A and 1 part by volume of component B which gave a ratio of NCO—OH equivalents of 1.5 to 1.0. This material gave good adhesion and stability over a variety of humidity and temperature conditions. It gave excellent temperature flexibility over wide temperature ranges, particularly at temperatures below 40° F. The cold temperature flexibility was tested using the method described in Example 1, but was checked on coated foam cooled to 10° F. Again there were no cracks, breaks or other failures of the paint film.

Example 3

A two package system, having a dark blue color was compounded. Package A was made up as follows:

| | Lbs. |
|---|---|
| Red iron oxide | 3 |
| Titanium dioxide-chalk resisting | 150 |
| Phthalocyanine blue | 9 |
| Carbon black | 3 |
| Hard polyester of Example 1 | 58 |
| Flexible polyester of Example 1 | 58 |
| n-Butyl acetate | 77 |
| Xylol | 42 |

This mixture was ground in sand mill to 6.5 fineness and then to it was added:

| | Lbs. |
|---|---|
| Flexible polyester of Example 1 | 90 |
| Cellulose acetate butyrate | 14 |
| n-Butyl acetate | 60 |
| Ethyl acetate | 80 |
| Toluene | 101 |
| Xylol | 100 |
| Cellosolve acetate | 50 |
| Total | 900 |

The resulting material had a weight ratio of flexible polyester to hard polyester of 2.55 to 1 and a molar ratio of 1 to 0.84. This material was designated Component A, and was mixed with Component B of Example 1 at a ratio of 2 parts by volume of Component A to 1 part by volume of Component B. This gave a ratio of NCO—OH equivalents of 2.43 to 1.0.

The material of Example 3 gave excellent flexibility and impact resistance at temperatures as low as 20° F.

below zero and exhibited unusual yellowing and discoloration resistance. The cold temperature resistance was checked with the method described in Example 1, but it was run on coated foam cooled to −15° F. The impact resistance was checked using Gardners impact tester Mod. 1314. No breaks in the paint film occurred after impacting with 80 lbs. per inch power. The discoloration resistance was determined by exposing coated pieces of foam for 200 hours in the Atlas Twin Arc Weatheometer. At the end of the test there was no noticeable change in color or gloss.

Example 4

In order to illustrate a formulation suitable for use as a clear top-coat which may be applied directly over polyurethane foam substrates, or on top of one or more color coats as illustrated by the preceding examples in order to provide increased abrasion resistance, the following coating system was made up. Component A was made by mixing the following materials:

| | Lbs. |
|---|---|
| Silica gel | 40 |
| Hard polyester of Example 1 | 77 |
| Flexible polyester of Example 1 | 77 |
| Polyethylene dispersion (15% by weight polyethylene dispersed in xylol) | 61 |
| n-Butyl acetate | 155 |
| Xylol | 155 |
| Toluol | 46 |
| Ethyl acetate | 46 |

This was ground in the pebble mill for eight hours, to achieve a Hegman fineness of approximately 7, and to the mix was added:

| | Lbs. |
|---|---|
| Hard polyester of Example 1 | 10 |
| Flexible polyester of Example 1 | 10 |
| Cellulose acetate butyrate | 10 |
| Toluol | 61 |
| Ethyl acetate | 134 |
| Cellosolve acetate | 10 |
| Lead naphthanate | 5 |
| Total | 900 |

The resulting Component A had a weight ratio of flexible polyester to hard polyester of 1 to 1 and a molar ratio of 1 to 2.15. This material was mixed with Component B set forth in Example 1, using 3 parts by volume of Component A and 1 part by volume of Component B. This gave a ratio of NCO—OH equivalents of 1.70 to 1.0. This was applied over the coating of Example 1.

The coating system illustrated by Example 4 is particularly useful for those areas of an automobile which are subject to extreme abuse, and where crock resistance may be a major factor, such as on arm rest. The materials of this type illustrated by Example 4 have a clear, low sheen, and have been successfully used in such applications as an overcoating for arm rest.

The top coat may be applied over a color base coat after a five minute flash off dry, and monobake in 10 minutes at between 200 and 250° F. The topcoat illustrated in Example 4, when properly crosslinked with component B and cured 10 minutes at 250° F., will exhibit exceptionally good wear and scuff resistance. The Tabor Abrasor test, run as in Example 1, will show an average weight loss of 15–20 miligrams after 100 cycles with a CS 10 wheel and a 500 gms. weight load.

The application of the clear topcoat described in Example 4 does not reduce the flexibility of the coatings described in Examples 1, 2, and 3.

The coating systems of this invention may be compounded with various fillers, pigments and dyes. Fire retardants may be included in the coating systems.

The coating systems may be applied by any of the conventional techniques including spraying directly on the substrate, or by spraying on the interior surfaces of molds in which urethane polymers are subsequently foamed. Other application techniques will be obvious to those skilled in the art.

The coating systems of this invention are particularly adaptable to coating applications which require flexibility. While the examples have illustrated the coating of polyurethane foam substrates, the invention is not so limited, but the coating systems described herein may be applied to other foams such as latex or vinyl foam, and non-foamed substrates including plastics, rubber, wood, metal and the like.

The forms of the invention herein shown and described are to be considered only as illustrative. It will be apparent to those skilled in the art that numerous modifications may be made therein without departure from the spirit of the invention.

What is claimed is:

1. A coating composition, which is curable to form a non-yellowing, polyurethane based coating having good gloss retention and good adhesive binding capacity, comprising (A) a mixture of polyols which comprises (1) a flexible hydroxyfunctional polyester, having a molecular weight between about 1500 and about 4000 and being essentially difunctional; and (2) a hard hydroxyfunctional polyester having a molecular weight between about 800 and 3000, having an equivalent weight of between about 300 and about 500 and having a functionality higher than about 2.8; and (b) a polyisocyanate selected from the group consisting of aliphatic diisocyanates having the formula:

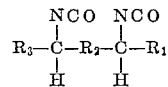

wherein $R_2$ is selected from the group consisting of lower alkylene, cycloalkylene, lower alkylidene, and lower cycloalkylidene, and $R_1$ and $R_3$ may be the same or different and are selected from the group consisting of hydrogen and the radical

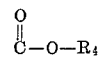

wherein $R_4$ is selected from the group consisting of alkyl, alkaryl, alkoxyalkyl, aryl, aralkyl, and brominated and chlorinated derivatives thereof, and adducts of such diisocyanates with polyols; wherein the resultant ratio of NCO—OH equivalents is higher than about 1:1 but not more than 2.5:1.

2. A coating composition as described in claim 1, wherein the mixture of polyols comprises from about 1 to about 4 parts by weight of said flexible polyester for each part by weight of said hard polyester.

3. A coating composition as described in claim 1, wherein said flexible polyester comprises the reaction product of an aliphatic dicarboxylic acid, and a slight stoichiometric excess of an ether containing glycol.

4. A coating composition as described in claim 3, wherein the ether containing glycol is diethylene glycol.

5. A coating composition as described in claim 1, wherein said hard polyester comprises the reaction product of dicarboxylic acids and a slight stoichiometric excess of a mixture of polyols, comprising a major amount of an aliphatic glycol and a minor amount of a polyol which is at least trifunctional.

6. A coating composition as described in claim 5, wherein the aliphatic glycol is 1,3-butanediol.

7. A coating composition as described in claim 5, wherein said dicarboxylic acids includes up to about 40 mole percent of an aromatic dicarboxylic acid.

8. A self-skinned polyurethane foam article having thereon a cured coating produced from the coating composition of claim 1.

9. A self-skinned polyurethane foam article having thereon a cured pigmented coating produced from the coating composition as described in claim 1.

10. A self-skinned polyurethane foam article, having thereon a cured coating comprising a pigmented under coating produced from the coating composition described in claim 1 and an unpigmented top coating produced from the coating composition described in claim 1.

11. A coating composition which is curable to form a non-yellowing, polyurethane based coating having gloss retention and good adhesive binding capacity, comprising (A) a mixture of polyols which comprises (1) a flexible hydroxyfunctional polyester, having a molecular weight between about 1500 and about 400 and being essentially difunctional; and (2) a hard hydroxyfunctional polyester having a molecular weight between about 800 and 3000, having an equivalent weight of between about 300 and about 500 and having a functionality higher than 2.8; and (B) a polyisocyanate selected from the group consisting of aliphatic diioscyanates having the formula:

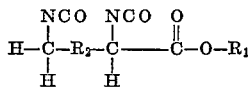

wherein $R_2$ is selected from the group consisting of lower alkylene, cycloalkylene, lower alkylidene, and lower cycloalkylidene, and $R_1$ is selected from the group consisting of alkyl, alkaryl, alkoxyalkyl, aryl, aralkyl, and brominated and chlorinated derivatives thereof, and adducts of such diisocyanates with polyols; wherein the resultant ratio of NCO—OH equivalents is higher than about 1:1 but not more than 2.5:1.

12. A coating composition as described in claim 11, wherein the mixture of polyols comprises from about 1 to about 4 parts by weight of said flexible polyester for each part by weight of said hard polyester.

13. A coating composition as described in claim 11, wherein said flexible polyester comprises the reaction product of an aliphatic dicarboxylic acid, and a slight stoichiometric excess of an ether containing glycol.

14. A coating composition as described in claim 14, wherein the ether containing glycol is diethylene glycol.

15. A coating composition as described in claim 11, wherein said hard polyester comprises the reaction product of dicarboxylic acids and a slight stoichiometric excess of a mixture of polyols, comprising a major amount of an aliphatic glycol and a minor amount of a polyol which is at least trifunctional.

16. A coating composition as described in claim 15, wherein the aliphatic glycol is 1,3-butanediol.

17. A coating composition as described in claim 15, wherein said dicarboxylic acids includes up to about 40 mole percent of an aromatic dicarboxylic acid.

18. A self-skinned polyurethane foam article having thereon a cured coating produced from the coating composition of claim 11.

19. A self-skinned polyurethane foam article having thereon a cured pigmented coating produced from the coating composition as described in claim 11.

20. A self-skinned polyurethane foam article, having thereon a cured coating comprising a pigmented under coating produced from the coating composition described in claim 11, and an unpigmented top coating produced from the coating composition described in claim 11.

21. A coating composition, which is curable to form a non-yellowing, polyurethane based coating having good gloss retention and good adhesive binding capacity, comprising (A) a mixture of polyols which comprises (1) a flexible hydroxyfunctional polyester, having a molecular weight between about 1500 and about 4000 and being essentially difunctional and (2) a hard hydroxyfunctional polyester having a molecular weight between about 800 and 3000, having an equivalent weight of between about 300 and about 500 and having a functionality higher than about 2.8; and (B) a polyisocyanate selected from the group consisting of aliphatic diisocyanates having the formula:

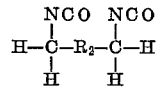

wherein $R_2$ is selected from the group consisting of lower alkylene, cycloalkylene, lower alkylidene, and lower cycloalkylidene, and wherein the resultant ratio of

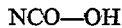

equivalents is higher than about 1:1 but not more than 2.5:1.

22. A coating composition as described in claim 21, wherein the mixture of polyols comprises from about 1 to about 4 parts by weight of said flexible polyester for each part by weight of said hard polyester.

23. A coating composition as described in claim 21, wherein said flexible polyester comprises the reaction product of an aliphatic dicarboxylic acid, and a slight stoichiometric excess of an ether containing glycol.

24. A coating composition as described in claim 23, wherein the ether containing glycol is diethylene glycol.

25. A coating composition as described in claim 21, wherein said hard polyester comprises the reaction product of dicarboxylic acids and a slight stoichiometric excess of a mixture of polyols, comprising a major amount of an aliphatic glycol and a minor amount of a polyol which is at least trifunctional.

26. A coating composition as described in claim 25, wherein the aliphatic glycol is 1,3-dibutanediol.

27. A coating composition as described in claim 25, wherein said dicarboxylic acids includes up to about 40 mole percent of an aromatic dicarboxylic acid.

28. A self-skinned polyurethane foam article having thereon a cured coating produced from the coating composition of claim 21.

29. A self-skinned polyurethane foam article having thereon a cured pigmented coating produced from the coating composition as described in claim 21.

30. A self-skinned polyurethane foam article having thereon a cured coating comprising a pigmented under coating produced from the coating composition described in claim 21 and an unpigmented top coating produced from the coating composition described in claim 21.

References Cited

UNITED STATES PATENTS

| | | |
|---|---|---|
| 2,880,192 | 3/1959 | Coffey et al. _____ 260—858 |
| 3,012,987 | 12/1961 | Ansul _____ 260—858 |
| 3,047,517 | 7/1962 | Wherley. |
| 3,288,732 | 11/1966 | Chapman et al. _____ 161—190 X |
| 2,901,467 | 8/1959 | Croco. |
| 2,994,110 | 8/1961 | Hardy. |
| 3,079,350 | 2/1963 | Bernstein. |
| 3,136,733 | 6/1964 | Ross et al. |
| 3,245,827 | 4/1966 | Weber. |
| 3,281,378 | 10/1966 | Garber et al. |
| 3,281,396 | 10/1966 | Barnes _____ 117—72 X |
| 3,310,533 | 3/1967 | McElroy. |

FOREIGN PATENTS 754,604   8/1956   Great Britain.

WILLIAM D. MARTIN, Primary Examiner

R. HUSACK, Assistant Examiner

U.S. Cl. X.R.

117—138.8, 161, 132; 260—858, 75, 77.5

UNITED STATES PATENT OFFICE
CERTIFICATE OF CORRECTION

Patent No. 3,473,951                         October 21, 1969

Frank De Rossi et al.

It is certified that error appears in the above identified patent and that said Letters Patent are hereby corrected as shown below:

Column 3, line 18, after "washability" insert -- and cleanability --; line 36, after "foams" insert -- , they are particularly useful for the flexible foams --. Column 4, line 14, "bromethyl" should read -- bromoethyl --; line 67, after "ethylene glycol" insert -- ; --. Column 5, line 44, cancel "be". Column 6, line 61, after "functionality" insert -- of approximately --. Column 11, line 9, after "having" insert -- good --; line 13, "400" should read -- 4000 --; line 40, "14" should read -- 13 --; line 70, after "difunctional" insert -- ; --. Column 12, line 33, "1,3-dibutanediol" should read -- 1,3-butanediol --.

Signed and sealed this 26th day of May 1970.

(SEAL)
Attest:

EDWARD M. FLETCHER, JR.                   WILLIAM E. SCHUYLER, JR.
Attesting Officer                           Commissioner of Patents

PO-1050
(5/69)

UNITED STATES PATENT OFFICE
CERTIFICATE OF CORRECTION

Patent No. 3,473,951      Dated October 21, 1969

Inventor(s) Frank DeRossi and Carl O. Osterberg

It is certified that error appears in the above-identified patent and that said Letters Patent are hereby corrected as shown below:

Column 6, <u>line 14</u>, after "solution" insert

--applying them to the substrate--.

SIGNED AND
SEALED

SEP 29 1970

(SEAL)
Attest:

Edward M. Fletcher, Jr.
Attesting Officer

WILLIAM E. SCHUYLER, JR.
Commissioner of Patents